United States Patent
Unkel et al.

(10) Patent No.: US 8,624,960 B2
(45) Date of Patent: Jan. 7, 2014

(54) MULTI-VIEW DISPLAY SYSTEM

(75) Inventors: Christopher Unkel, Palo Alto, CA (US); Lawrence L. Butcher, Mountain View, CA (US); James G. Hanko, Redwood City, CA (US); J. Duane Northcutt, Menlo Park, CA (US); Brian K. Schmidt, Mountain View, CA (US); Edwin C. Seim, Campbell, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 616 days.

(21) Appl. No.: 12/848,037

(22) Filed: Jul. 30, 2010

(65) Prior Publication Data
US 2012/0026157 A1    Feb. 2, 2012

(51) Int. Cl.
*H04N 7/18* (2006.01)
(52) U.S. Cl.
USPC .................................. 348/46; 348/47; 348/51
(58) Field of Classification Search
USPC ....................................... 348/36–61, 143–160
See application file for complete search history.

(56) References Cited

U.S. PATENT DOCUMENTS

| | | | |
|---|---|---|---|
| 2006/0285026 A1* | 12/2006 | Robinson | 349/15 |
| 2007/0263003 A1* | 11/2007 | Ko et al. | 345/502 |
| 2008/0043209 A1* | 2/2008 | Widdowson et al. | 353/94 |
| 2009/0167845 A1* | 7/2009 | Khan | 348/51 |
| 2010/0007582 A1* | 1/2010 | Zalewski | 345/8 |
| 2010/0177172 A1 | 7/2010 | Ko et al. | |

FOREIGN PATENT DOCUMENTS

| | | |
|---|---|---|
| JP | 2005-078091 | 3/2005 |
| JP | 2007-507945 | 3/2007 |
| KR | 10-2007-0053813 | 5/2007 |
| WO | WO2006/043720 | 4/2006 |

OTHER PUBLICATIONS

"DuMont Duoscopic", Early Television Museum, Postwar American TW, http://www.earlytelevision.org/dumont_duoscopic.html, downloaded Aug. 12, 2010.
"Sharing a Single TW with Different Views for Two or More Viewers", 3D Vision Blog, Jul. 20, 2010, http://3dvision-blog.com/, downloaded Aug. 12, 2010.
International Search Report and Written Opinion from PCT/US2011/045327 mailed Feb. 29, 2012, 8 pgs.

* cited by examiner

*Primary Examiner* — Andy Rao
(74) *Attorney, Agent, or Firm* — Blakely Sokoloff Taylor Zafman LLP (57) ABSTRACT

Embodiments of the invention are generally directed to a multi-view display system. An embodiment of an apparatus includes a display screen to display multiple views simultaneously, and a controller to control the views presented on the display screen. The apparatus is configurable by the controller to provide multiple view settings, the view settings including a first setting in which the apparatus provides a single view to each viewer of the display screen and a second setting in which the apparatus provides a first view to a first viewer of the display screen and a second view to a second viewer of the display screen. A first filtering element filters views presented to viewers of the display screen such that an intended view is displayed to one or more viewers.

29 Claims, 8 Drawing Sheets

MULTI-VIEW DISPLAY SYSTEM

TECHNICAL FIELD

Embodiments of the invention generally relate to the field of electronic devices and, more particularly, a multi-view display system.

BACKGROUND

Display systems may display images or views to users of the systems. A display screen for a system may include a television screen, a computer screen, a movie screen, and other similar displays. There are often many different possible views or programs that are available for a display screen.

If more than one image is desired for users, in a conventional system multiple screens may be used in one installation, or a single screen may provide multiple images by dividing the screen, such as in the use of picture-in-picture (PIP) and side-by-side modes for a display screen.

However, the use of a divided display screen compromises the utility or experience that is provided by each of the displayed views on such screen. If a single display screen is divided, providing a split screen, then each image by necessity is smaller than the full size of the display screen. If instead a picture-in-picture (PIP) display is utilized on a display screen, a foreground PIP program will be much smaller than full-size, and will occlude a portion of a background program.

In addition, whether a divided screen or multiple screens are used, each of the views that are provided on the multiple or divided screens is visible to all users in a location or venue, thus creating a visual distraction for all users and limiting the potential usage of the display screen or screens.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to a multi-view display system.

In a first aspect of the invention, an embodiment of an apparatus includes a display screen to display multiple views simultaneously, and a controller to control the views presented on the display screen. The apparatus is configurable by the controller to provide multiple view settings, the view settings including a first setting in which the apparatus provides a single view to each viewer of the display screen and a second setting in which the apparatus provides a first view to a first viewer of the display screen and a second view to a second viewer of the display screen. A first filtering element filters views presented to viewers of the display screen such that an intended view is displayed to one or more viewers.

In a second aspect of the invention, an embodiment of a method includes projecting multiple images on a first display screen, and providing images on the first display screen to one or more viewers, wherein providing the images includes a first setting for providing a single image to all viewers of the first display screen and a second setting for providing a first image to a first viewer and a second image to a second viewer, and wherein providing the images includes filtering the images projected by the first display screen to separate the images for viewing.

DETAILED DESCRIPTION

Embodiments of the invention are generally directed to a multi-view display system.

In some embodiments, a method, apparatus, or system provides for a multi-view display, wherein a display may provide multiple images to users. Existing viewing systems provide the same view to all users on a display screen. However, different users may wish to watch different views, which may include images that are related to each other or images that are not related to each other. In some embodiments, a group of users may share a display, with each individual or group of individuals seeing different material on the display. As used here, a display providing multiple different views at the same time is referred to as a "multi-view display".

In some embodiments, multiple inputs to a television or other display system or device may be shown simultaneously for viewing to allow users with multiple choices of views. The views may include any images, including streams of video data, that are available to the display system. For example, a first person may wish to view a sporting event on a home television screen, while a second person views a movie on the same television screen. In another example, parents may wish to view a news program on the television while children watch a DVD or other recorded program on the same television screen. In some embodiments, some or all of the multiple programs are provided simultaneously on a multi-view display.

In some embodiments, multiple programs for a multi-view display may be received on different channels, such as different television channels, or the programs might be received from different inputs to the display system or device. For example, programs directed to a multi-view display may include a live broadcast from a cable set-top box, a movie from a DVD player or other video storage medium, a video game from a game console, and a computer program.

In some embodiments, multiple views may include partial images that are only viewed by certain users and not others. For example, a multi-view display may limit a PIP to only certain users, such as a circumstance in which everyone in a room may view a movie or other similar program, while only a subset of users see an inset of another program, such as a live football game. In another example, only a subset of viewers may view certain added text, where the text might be related information, such as subtitles for a film that only certain viewers see, or might be unrelated information, such as sports scores that only certain viewers see.

In some embodiments, a multi-view display apparatus or system includes a plurality of different view settings or states, including a first setting in which a single view is provided to all viewers of the multi-view display and a second setting in which a first view is provided to a first viewer and a second view is provided to a second viewer. In an example, a multi-view display apparatus or system may choose between providing a single three-dimensional (3D) image to each viewer of the display or providing different images to different viewers, such as a first two-dimensional (2D) image to a first viewer and a second 2D image to a second viewer. However, embodiments are not limited to these images, and may include various different displays of 2D and 3D images.

In some embodiments, a multi-view display may operate by utilizing a single video stream that provides multiple images in different regions of an image. In an example, a gaming system may utilize a single video stream with different regions of the total image serving different users. In some embodiments, a control unit operates to extract the different regions of the image, scale each region up to a full sized image, and present each image to the appropriate viewer or views. In an example, a left side region of an image may be targeted to a first viewer, while the right side region of the image is targeted to a second viewer. In some embodiments, the control unit separates the two regions, scales each region to a full screen size, then provides the expanded, full screen size left view to the first viewer and the expanded, full screen right view to the second viewer.

Figure 1:
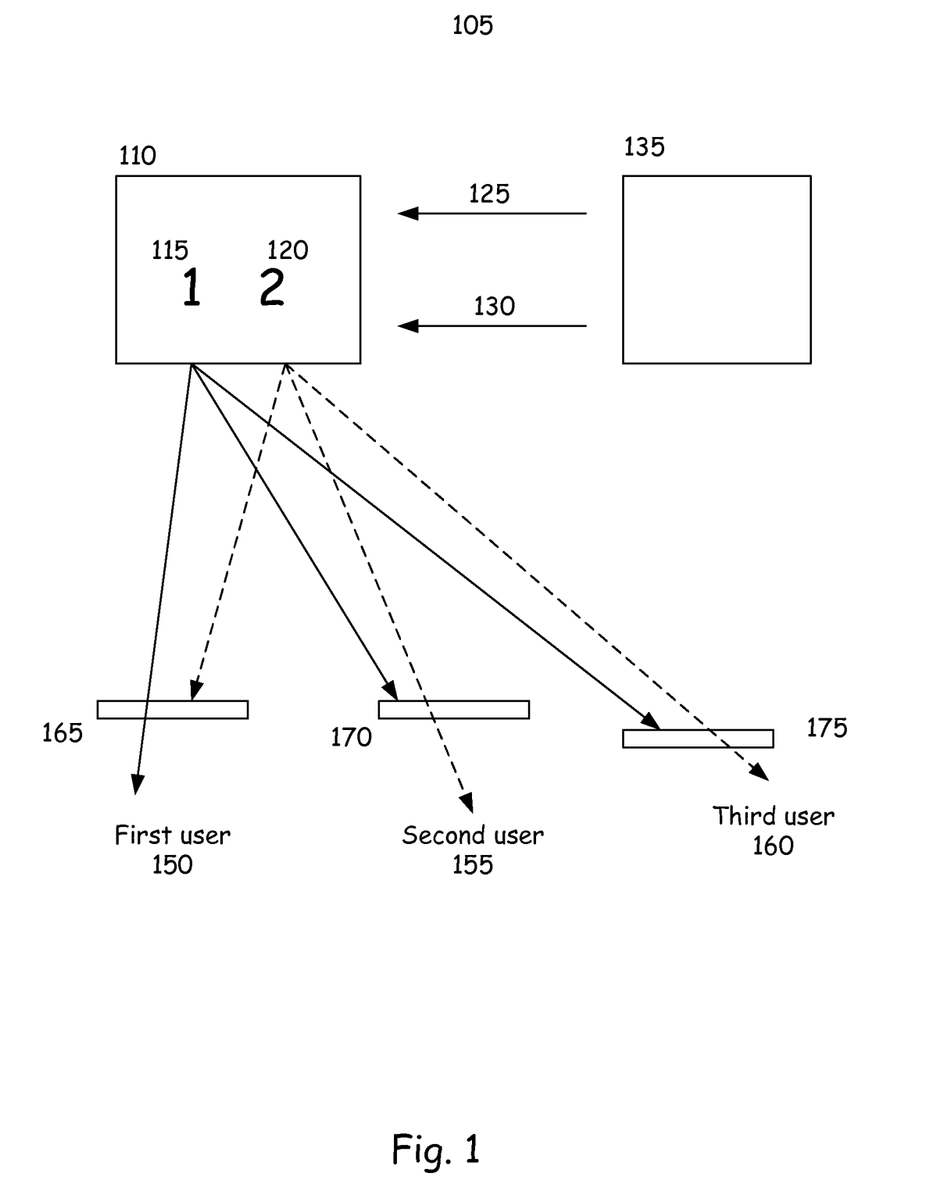
FIG. 1 is an illustration of an embodiment of a multi-view display system.

FIG. 1 is an illustration of an embodiment of a multi-view display system. In some embodiments, a multi-view display system 105 includes a display to provide multiple views. As shown, the multiple views include a first view 115 resulting from a first stream of video data 125 and a second view 120 resulting from a second stream of video data 130, where the streams of video data are shown being provided by a control unit 135 of the multi-view display system 105. While FIG. 1 illustrates two views being presented by the multi-view display system 105, embodiments are not limited to this number of views, and may provide two or more views. While for ease of explanation this discussion generally describes views that include a single set of data for an image, thus a two-dimensional (2D) representation, embodiments may also include three-dimensional (3D) images that may require multiple sets of data for an image, such as a first stream of data for a left eye image and a second stream of data for a right eye image.

In some embodiments, in a first setting, a single view may be provided to all viewers of the display and in a second setting, a first view may be provided to one or more viewers of the display while a second view is provided to one or more other viewers of the display. In this illustration, the multiple views 115 and 120 are presented to multiple different users or users, shown here as a first user 150, a second user 155, and a third user 160. In some embodiments, multiple users or groups of users may observe the different views presented on the display. In some embodiments, each user is able to choose or to be assigned one of the multiple views. In some embodiments, a certain intended view of the multiple views is allowed through a filtering device or element for viewing by a user, with other views being filtered out such that these other views are not seen by the user.

In this illustration, first filtering device or element 165 allows first view 115 to be viewed by first user 150, while filtering out second view 120. Further, second filtering device or element 170 and third filtering device or element 175 allow second view 120 to be viewed by second user 155 and third user 160 respectively, while filtering out first view 115. For the purposes of this illustration, a single filtering device or element is provided for each user, but embodiments are not limited to this implementation. In some embodiments, a single filtering device or element may be used for some or all of a group of users, and in some embodiments, multiple filtering devices or elements may be used for each user.

Figure 2:
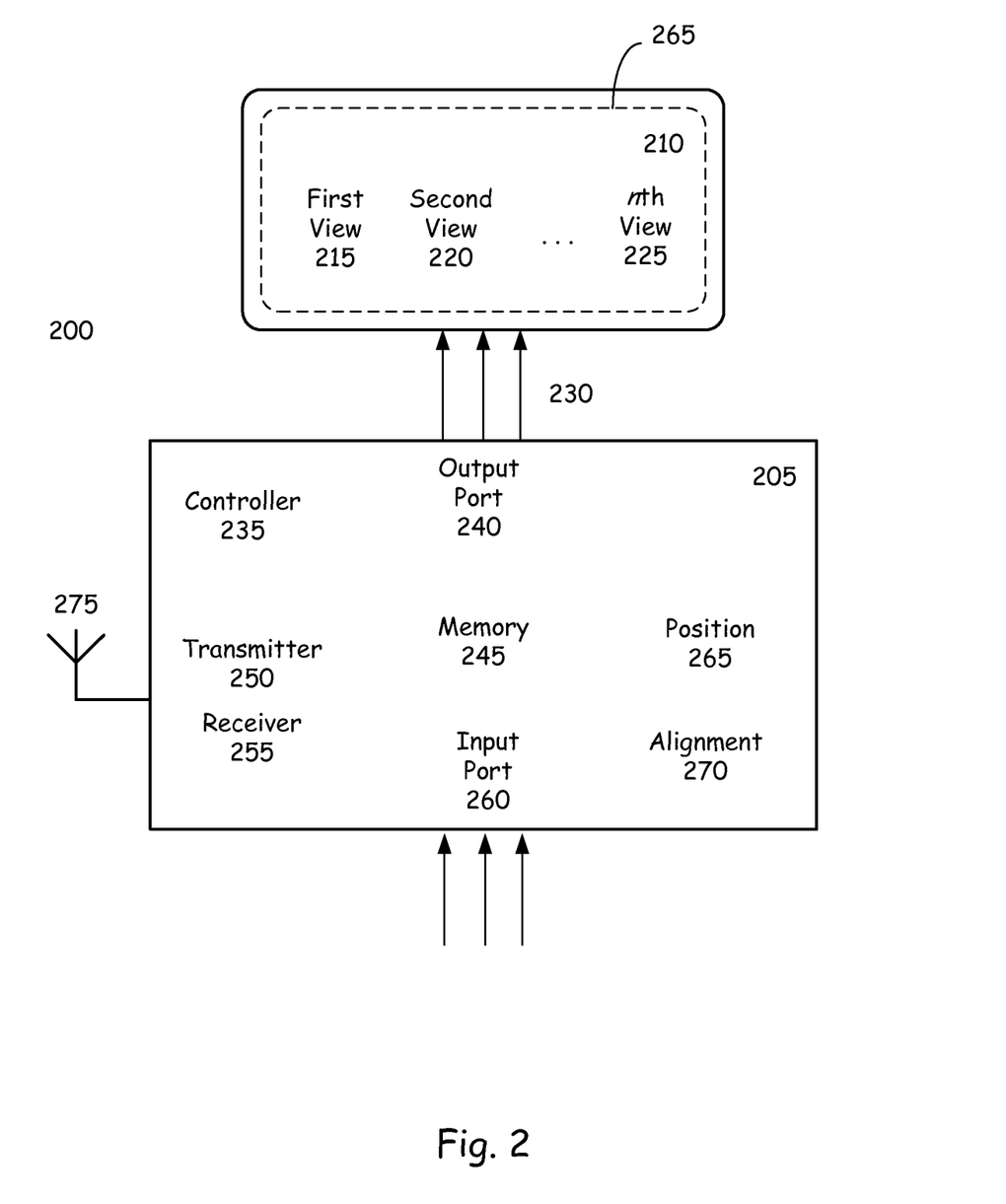
FIG. 2 is an illustration of an embodiment of a multi-view display apparatus.

FIG. 2 is an illustration of an embodiment of a multi-view display apparatus. In some embodiments, a multi-view display apparatus 200 includes a control unit 205, and includes or is coupled with a display 210. In some embodiments, the display 210 displays multiple views simultaneously, such as first view 215 and second view 220 through an nth view 225. In some embodiments, the control unit 205 includes a controller 235 to control the presentation of the multiple views on the display 210, including the implementation of at least a first setting to provide a single view to all viewers of the display and a second setting to provide different views to different viewers of the display. In some embodiments, the control unit 205 provides multiple video streams 230 via a link, such as provided via an output port 240, to generate the various views 215-225. In some embodiments, the link utilized to transmit multiple video streams may also transmit corresponding audio streams.

In some embodiments, the control unit 205 includes a memory 245 to hold or buffer data for presentation of the multiple views. In some embodiments, the control unit 205 includes a transmitter 250 to transmit signals to filter elements, such as signals to direct the switching of switching filter elements, and a receiver 255 to receive signals from filter elements, such as status signals received from filter elements or devices including filter elements, via one or more antennas 275 or other communication elements. In some embodiments, the control unit 205 includes an input port 260 to receive one or more data streams for presentation on the display 210. In some embodiments, the control unit 205 includes a position element 265 to determine or detect the position of one or more users in relation to the display 210. In some embodiments, the control unit includes an alignment element 270 to align multiple video streams with each other for display.

In some embodiments, control unit 205 may be utilized for video game operation. In some embodiments, a computer or console game system may include a multi-view display for multi-player game play. In an implementation, a display screen may project a video game in which multiple players use the same display, but with each player seeing different views. A conventional gaming system may include a split-screen view, but such a split-view results in effectively reducing a screen size for each user. Furthermore, in the conventional system, each player can see the other's view, which may be an impediment or disadvantage for certain games. In an example of a first person shooting game or similar game, the ability of a first player to act without knowledge of a second player, such as to sneak up on the second player, may be an important part of the game play. The ability to accomplish this is significantly compromised if each player can see the other player or players' screens. In some embodiments, a multi-view display provides each player (or group of players) with a distinct, full-sized image that is not visible to other players, thereby allowing full screen viewing with individual views for each player or group of players.

In some embodiments, multiple views are initially combined in a single image, wherein certain regions of the image are intended for different viewers or groups of viewers. In some embodiments, the control unit 205 operates to separate the regions of the image, scale each region up to a larger (such as full screen) size, and present the multiple images to viewers. In this manner, a device or system that is generating images for multiple viewers is only required to provide a single data stream, rather than multiple data streams. In an example, a gaming system that provides side-by-side image regions for two players may provide the image stream to a multi-view display apparatus or system, and the multi-view display apparatus or system may operate to extract the images for simultaneous full-screen display to players of the game.

In some embodiments, a multi-view display system or device is utilized to provide a head-tracked view to multiple people simultaneously. Stereoscopic displays are a popular technology for giving users the illusion of depth in conventional systems. However, stereopsis is not the sole depth-cueing mechanism for human vision, with motion parallax being another depth cue for a viewer. Motion parallax is the phenomenon providing that, as the viewpoint changes, close objects appear to move a greater amount than far objects. In some embodiments, a computer graphics system may provide a depth cue by observing or detecting the position of the system user relative to the display, and rendering a scene that is rendered as a view from the user's position. A disadvantage of conventional head-tracking systems is that displays can only show a scene rendered from a single viewpoint, and thus each display can only provide head tracking for a single user. For this reason, multiple user systems have required the use of multiple displays, such as, for example, a pair of VR (Virtual Reality) goggles to provide the required display for each user. In some embodiments, a multi-view display device or system may be used to remove this limitation in head-tracking displays, the display providing a different head-tracked view for each user.

In some embodiments, a multi-view display device or system may include one or more stereoscopic image streams. In some embodiments, a multi-view display with three or more independent channels may show both a stereoscopic (three-dimensional, or "3D") stream and a non-stereo (two-dimensional, or "2D") stream. In some embodiments, a multi-view display with four or more independent channels may show multiple independent stereoscopic streams. In some embodiments, a display may utilize multiple stereo streams to display multiple head-tracked, stereoscopic streams, thereby potentially providing each user with an independent view having multiple depth cues (stereopsis and motion parallax.)

In some embodiments, a multi-view display may be used to customize content for different groups of users. In a particular example, different advertisements may be directed to different users of a multi-view display system or device, with, for example, the choice of advertisements being related to a choice of view made by each viewer.

In some embodiments, a system may utilize and combine different elements for multi-view systems. For example, a system may provide a combination of directed content and PIP views directed to individuals who have chosen certain video streams on a multi-view display system.

In some embodiments, certain venues that are well suited for providing multiple views to users may include multi-view displays. For example, a movie theater utilizing a multi-view display may project multiple movies in a single room. It is common that, as movies near the end of their theater run, theaters showing such films are nearly empty. The ability to show multiple movies on a single screen would allow theater complexes to offer more programs or start time selections for a given number of theater screens. In some implementations, movies may be chosen together or combined for certain effect or attraction to audiences. For example, specific combinations of programming (a romantic movie shown at the same time as an action movie) may be used to attract couples or other groups. In some embodiments, the number of persons viewing each movie may be determined by determining how many filter element glasses are set for each view.

In some embodiments, a venue that currently has a shared display, such as an airplane with a shared display (often a ceiling-mounted display) may expand to provide passengers or other users a choice of programs. In the example of video delivery to an airplane screen, the venue conventionally has a provision for delivery of independent audio streams that passengers may listen to via headset to provide audio for each of the chosen video streams.

Stereoscopic displays have become increasingly popular. Such systems generally utilize a mechanism to display two related images, such that one of the related images is provided to a user's left eye and a second is provided to the user's right eye, thereby creating an impression of image depth to the user. In such an application, the two images are closely related, with each providing a view of the same scene from a slightly different perspective. Moreover, each user receives the same two images.

In some embodiments, a filtering element, such as a pair of glasses, may be used by a user to view a particular display or view provided by a multi-view display system. In this description, "glasses" refer to any optical device utilized by a user of a multi-view display system, and may include a pair of eyeglasses, a set of goggles, or other similar device.

Figure 3:
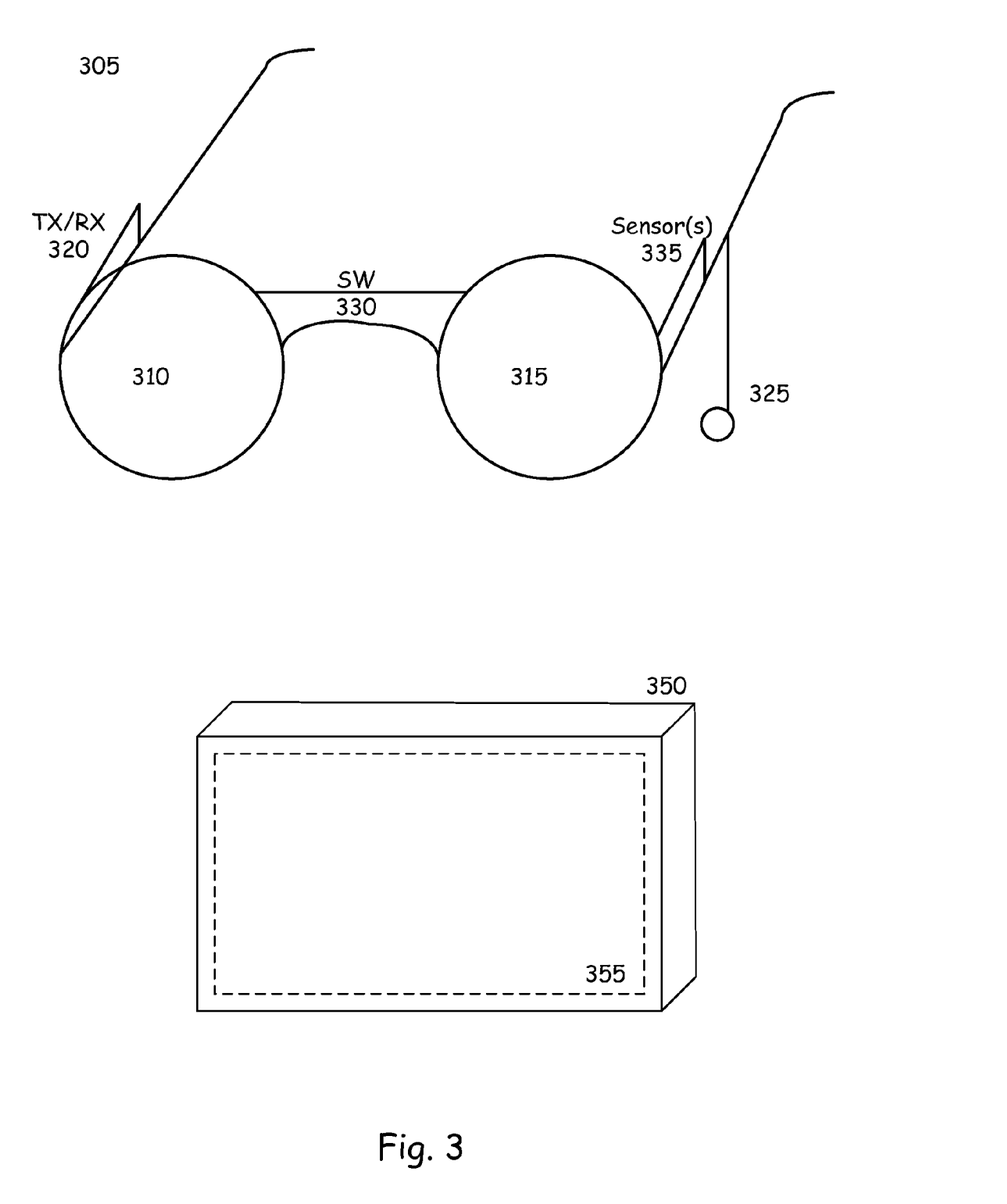
FIG. 3 is an illustration of an embodiment of a filtering element for use in a multi-view display system.

FIG. 3 is an illustration of an embodiment of a filtering element for use in a multi-view display system. In some embodiments, the filtering element may be in the form of separate filters provided for each user, such as glasses 305 or similar element to be worn by individuals. In some embodiments, the filtering element may be a part of or an attachment to a multi-view display 350, such as a lens or filter 355 for the multi-view display 350. In an example, the lens or filter may be a directional lens or filter that allows a different view in different locations.

In some embodiments, the glasses include a separate filter for each eye, such as left eye filter (the filter for the left eye of a user) 315 and right eye filter 310. The filters may include, but are not limited to, the filters described herein, such as polarized filters, shutters, and color filters. In some embodiments, the filters 310-315 may be fixed elements, for which a view for a user is selected by choosing a set of glasses that are compatible with the selected view.

In some embodiments, the filters 310-315 are selectable filters, and thus the glasses 305 may be set for the selected view. In some embodiments, the glasses 305 may include a switching element 330 for switching the filters to the appropriate settings for the selected view setting. In some embodiments, the switching element 330 may be set by the user, and in some embodiments, the switching element 330 may be remotely switchable, such as in response to a signal from the multi-view switching system. In some embodiments, the glasses may include a transmitter, receiver, or both, shown as transceiver 320, to send signals to the system, receive signals from the system, or both.

In some embodiments, the glasses 305 may include one or more sensors 335 to detect a state of the filter element, the state including, for example, whether the glasses are in use, the view to which the glasses are set, the location of the glasses in relation to the multi-view display system, and other data regarding the use of the glasses. The sensors 335 may further include a sensor to determine a direction of the glasses 305, such as would be used in a head tracking implementation.

Many display technologies for multi-view displays may require that each user of the display wear a pair of glasses to filter out unwanted video data. In some embodiments, because each user is wearing glasses, other functions are combined with the filtering function in the glasses. In some embodiments, the glasses 305 may include a sound element 325, where the sound element provides an audio stream that relates to a video stream for the selected view. For example, the glasses 305 may include earphones to present the appropriate audio to user. In some embodiments, the audio stream may be received from the multi-view display system, such as through the transceiver 320.

In some embodiments, glasses used for multi-view displays further allow a user to select which video stream to view. In some embodiments, active glasses, such as shutter glasses based on LCD lenses, may include a button, switch, or dial that selects which view of multiple displayed views the user wishes to receive. In some embodiments, passive glasses based on polarizers may include mechanical selection of views. For example, polarized glasses that allow a ninety-degree rotation of their lenses could be used to select views. Circular polarizers are typically constructed of a linear polarizer and a quarter-wave plate. If the glasses permit a ninety-degree rotation of one against the other, the handedness of the lenses can be controlled mechanically. This may be accomplished with rotation of the quarter-wave plate while the polarizer remains fixed, rotation of the polarizer while the quarter-wave plate remains fixed, or differing rotation of the two.

In another example, a pair of glasses may consist of quarter-wave plate, linear polarizer, and quarter-wave plate. With the appropriate alignment of the three layers, reorienting the lenses may change between left- and right-handed polarization, and thus may be used to select a view.

In some embodiments, a liquid-crystal polarizer may be substituted for a linear polarizer, with electronic control of the orientation of the liquid crystal substituting for physical rotation of the polarizer. In some embodiments, the glasses may include a control for the user to select which view the glasses deliver. Embodiments in which each eye may be controlled independently may be used for both multi-view and stereoscopic viewing.

In some embodiments, controllable glasses may be controlled by a multi-view display system rather than directly by a user. In such a system, numerous pairs of glasses may be controlled. In some embodiments, a system utilizes a communication channel, such as infrared or Bluetooth channel, over which glasses could be addressed, individually or in groups, to provide a signal to direct which view each pair of glasses or group of glasses should see. In some embodiments, a pair of glasses includes or has access to a receiver, such as a portion of transceiver 320 of FIG. 3, to receive the signal, and is operable to switch to a chosen channel in response to a received signal. In some embodiments, a system may utilize glasses in, for example, a group game with changing teams. In an example, a two-view display may pick the best suited of multiple possible advertisements for each user in a large group. A display could direct the glasses worn by users to switch between multi-view and stereoscopic modes as appropriate to the content it is showing.

In some embodiments, an additional function that glasses may perform is to deliver appropriate audio to a user. A user wearing glasses to view a particular video stream may also require separate audio, and thus it may be useful to combine audio delivery with video delivery. In some embodiments, a pair of glasses would receive audio from a multi-view display or system over a wired or wireless communication channel (e.g. Bluetooth, or other radio frequency (RF) channel). In some embodiments, glasses may include a set of headphones or similar device, such as element 325 of FIG. 3. In some embodiments, the glasses may either receive all audio programs from the display and present only one to the user, or include a back-channel used to select the audio program sent by the display. Glasses with a mechanism for the user to select the video program, as described above, would automatically select the corresponding audio program.

In some embodiments, an additional function for glasses used in a multi-view display system is to sense when the glasses are in use and to communicate this information to the display system. In some embodiments, glasses may include sensors such as sensors 335 of FIG. 3. In some embodiments, the glasses may sense when the glasses are in use with: a switch the user operates (such as a power switch); a contact sensor detecting when the glasses are on a user's head; a light sensor that is occluded when the glasses are on a user's head; or a switch that detects when the temples of the glasses are unfolded. In some embodiments, glasses may communicate their status as being in use to the display system over a wireless link, such as Bluetooth, infrared, RF, or Wi-Fi, as illustrated by transceiver 320 of glasses 305 in FIG. 3. In some embodiments, glasses, whether fixed glasses or switchable glasses, may communicate the view to which the glasses correspond. In an example, if a particular set of glasses may be switched between a first view and a second view, and such glasses are in use in the first view, the glasses may provide a signal to the multi-view display system indicating that the glasses are in use and are set to the first view.

In some embodiments, a multi-view display system may sense which glasses are in use based on signals received from viewing glasses, and thus which streams are requested, and the system may use this information to optimize the display. For example, a multi-view display based on shutter glasses may direct the glasses to remain consistently open when only one stream is needed, thus reverting to a single-view display.

In some embodiments, a system may optically sense which devices are in use through use of a camera, where the camera generates a view of the users and the system detects distinguishing marks, such as distinguished patterns, on the glasses.

In some embodiments, users viewing independent streams via a multi-view display system may be provided a means of controlling the scenes independently. In some embodiments, a multi-view display system provide multiple remote controls, or other user interface devices, and provide a means for identifying which view the remote is controlling. In an implementation of a system where view selection is accomplished with glasses, each of pair of glasses and corresponding remote control may be provided with a common marking: for example red-framed glasses and a red remote for view 1, and blue-framed glasses and a blue remote for view 2.

In some embodiments, a multi-view display system for a multi-view display may include:

(1) Display technologies may separate the images for left and right eyes by presenting them with different polarization, such as by using left-handed polarization for one eye and right-handed for the other. For stereoscopic viewing, a user may use a filtering element, such as a pair of glasses, in which each eye has a different circular polarizer. In some embodiments, for viewing multiple independent streams with a multi-view display, at least two different varieties of glasses may be used, such as a pair of glasses with left-circular polarizers in each eye to allow a first user to see only a first stream of images, and a pair of glasses with right-circular polarizers in each eye to allow a second user to see only a second stream of images. For example, for glasses 305 illustrated in FIG. 3, the left eye filter 315 and the right eye filter 310 may be matching. Certain display technologies similarly utilize orthogonal linear polarizations, for example vertical and horizontal polarization.

In an example, a system provides a stereoscopic image and a non-stereoscopic image on a multi-view display. In an example, a pair of glasses with, for example, both eyes left-circular polarized may allow a user to see a non-stereoscopic view of a stereoscopic display. In an implementation, a user who finds stereo 3D content objectionable may utilize these glasses to see a 2D view of the movie, while sharing a theater with friends who enjoy the 3D effects.

(2) In some embodiments, a line-alternate polarizing display may be used for a multi-screen display. In some embodiments, the number of vertical lines may be increased to preserve the resolution of the display in independent mode. In an example, the number of vertical lines may be doubled to allow two users to view full resolution images, such as a 1920×2160 display being utilized to display two independent images at full 1080 p resolution.

(3) In some embodiments, a time sequential display may be implemented in a multi-view display system or device. A stereoscopic display may use time-sequential display of left and right images, wherein, for example, the left view is provided in even frames and the right view is in odd frames. In a stereoscopic system, matching active shutter glasses may be utilized to open view at the correct times for the left eye to view the even frames and the right eye to view the odd frames. In some embodiments, a time sequential display is utilized to display two independent data streams. If, for example, a first data stream is provided in even frames and a second data stream is provided in odd frames, then a first set of glasses (for viewing the images represented by the first data stream) would open both eyes to view the even frames and close both eyes to avoid viewing the odd frames, while a second set of glasses (for viewing the images represented by the second data stream) would open both eyes to view the odd frames and close both eyes to avoid viewing the even frames.

While the above example illustrates an implementation utilizing two data streams, embodiments using time-sequential display are not limited to two data streams, In some embodiments, three or more independent images may be shown, with the number of independent images being limited only by factors such as the brightness, response time, bandwidth, and other features of the display.

(4) In some embodiments, a system may utilize multiple sets of primary colors, such as six primary colors (two red, two green, two blue) with slightly varying wavelengths, with matching glasses to filter appropriately to show stereo contents. In some embodiments, varying primary colors are used to provide multiple independent images. In an example, the same filter may be provided in each eye of any pair of glasses, but with the filters differing depending on which data stream is to be viewed by the pair of glasses. In some embodiments, any number n data streams, n≥2, may be viewed on a multi-view display screen by utilizing n different types of glasses, by using n reds, n greens, and n blues, if there is sufficient light produced by a light source and if wavelength filters sufficiently differentiate between light frequencies.

In some embodiments, any of the preceding described implementations may be combined to increase the number of independent images provided by a multi-view display system or device. For example, a circularly polarized method (providing two channels) may be combined with an alternating-frame time sequential method (providing two channels) to yield four independent channels.

In some embodiments, additional display techniques for stereo may be utilized to view multiple images on a multi-view display. In an example, lenticular displays provide different images at different viewing angles of a display, which may be used in certain circumstances for stereoscopic images. In some embodiments, multiple views may be provided to different users depending on the viewing angle for the user. Such display technology may be used in, for example, the front of an automobile to show a movie to a front-seat passenger while occluding view by the driver in order to avoid distraction, or to show a navigation display to the driver while the passenger sees an entertainment program. In some embodiments, lenticular displays may be combined with other approaches to increase channels for viewing. For example, a display that is both lenticular and polarized could offer two channels to the left side of a room or other location, and two additional channels to the right side of the room.

In some embodiments, anaglyph and other complementary-color filters (red/cyan, amber/blue, magenta/green, etc.) may be used for stereo display. In some embodiments, such filters may be combined with another technology for providing multiple viewing to provide multiple stereoscopic images from a multi-screen display.

In some embodiments, a system or device may transport, combine, and process video data so that such video data may be displayed on a multi-view display. In some embodiments, a multi-view display includes inputs to allow input of multiple streams simultaneously. In some embodiments, a system may utilize multiple existing video inputs.

In some embodiments, a method or process for conveying multiple streams on a single link is provided. A single device may be the source of multiple streams, as in the case of a game console generating views for multiple players. In some embodiments, video switching equipment such as audio/video receivers could be multi-stream aware. Such a link could also be used between devices inside a multi-view display.

Varying approaches may be utilized for conveying stereoscopic video over links, and in some embodiments such formats are reused and extended to provide for viewing of multiple images by different users. In a specific example, the HDMI™ (High-Definition Multimedia Interface) standard defines formats for 3D content. In some embodiments, the formats may be used to transport two independent streams of identical video format. In this example, metadata may be used to indicate that the two data streams are independent, as opposed to the data streams being parts of a 3D presentation. In an example, the metadata might take the form of currently reserved values in the 3D Structure field of the HDMI Vendor Specific Info Frame. In another example, metadata may also use a currently reserved bit elsewhere in the HDMI Vendor Specific Info Frame, or use a newly defined vendor-specific Info Frame.

In some embodiments, existing formats and techniques for transporting stereoscopic video can be generalized to allow more than two streams to be carried. For example:

(1) Three or more side-by-side images at full resolution;

(2) Three or more side-by-side images at reduced horizontal resolution (including such that the combined images fit into the native resolution of the display);

(3) Three or more horizontally-, vertically-, or diagonally-interlaced images; or (4) Three or more frame-interleaved streams.

In the transport of stereoscopic video, it is generally assumed that the video or images for the left and right eyes are of the same format. When multiple independent streams are transmitted, it is possible that the format of the streams will differ. In some embodiments, for streams with the same frame rate but different resolution, the largest format may be utilized, with metadata added to each video stream indicating the size of each stream. In some embodiments, a multi-view display may be utilized for combined streams that differ in size. In some embodiments, utilizing side-by-side formats, each image may be sent at its native width but with padding at the bottom and/or top of the image, thus reducing a required dot clock while providing consistent horizontal and vertical sync signals. Conversely, in some embodiments utilizing frame-interleaved formats, each image may be sent at its native height but with padding at right and/or left, thereby reducing bandwidth while providing consistent sync signals.

In some embodiments, data for multi-view formats are presented to a display system or apparatus that is multi-view aware and handles the multiple views as separate views. In some embodiments, a link may instead carry multiple streams in such a manner that a non-multi-view aware display would show such streams as a single stream. In some embodiments, the streams may be encoded in a frame-interleaved fashion, with all streams except the first contained within the vertical blanking interval; or in a side-by-side fashion, with all except the first contained within the horizontal blanking interval. In some embodiments, presence of the multiple streams to the multi-view aware could be indicated with metadata, or the receiver could detect the altered horizontal or vertical sync timing automatically.

Figure 4:
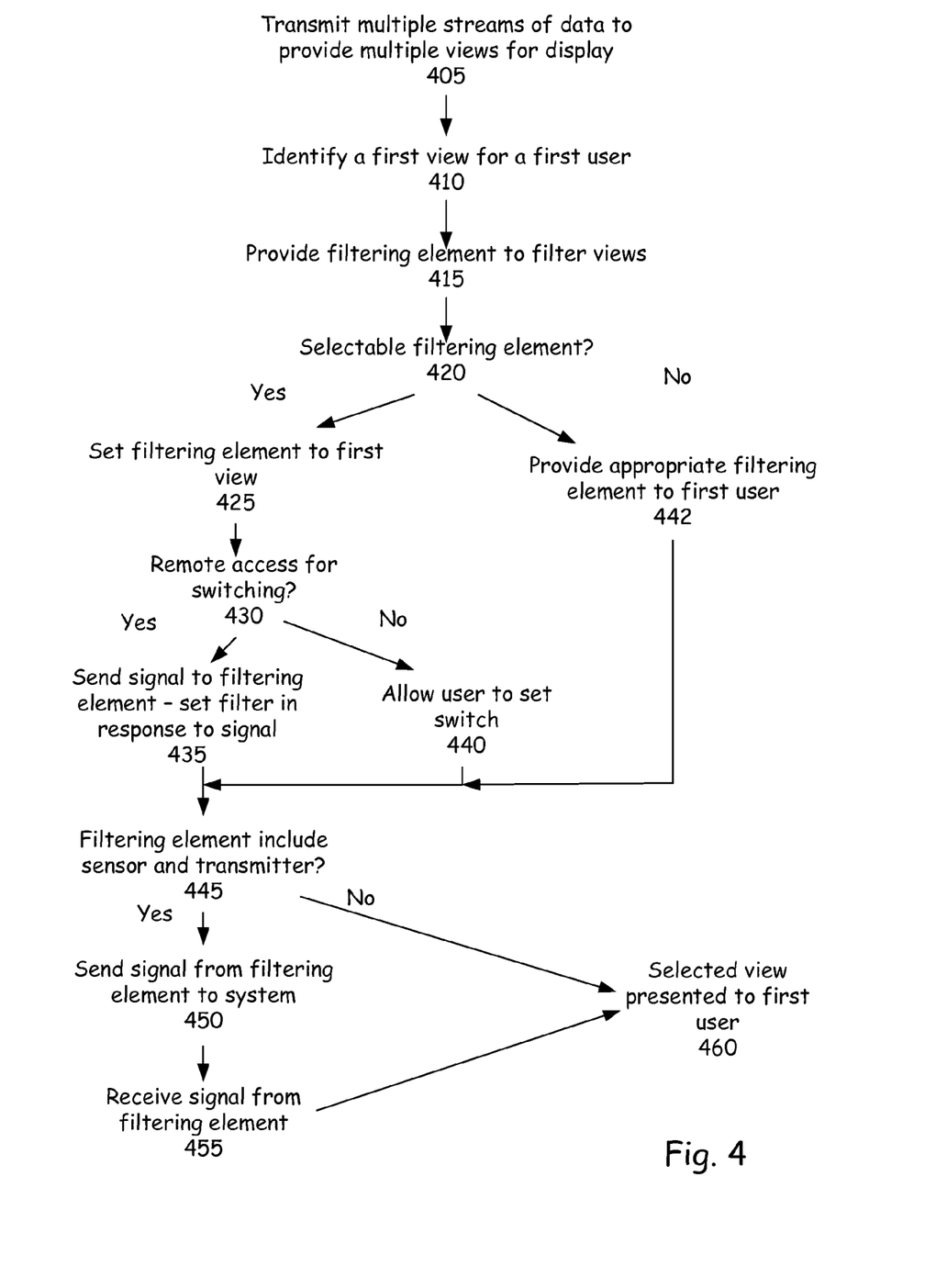
FIG. 4 is a flowchart to illustrate an embodiment of a process for providing multiple views on a display.

FIG. 4 is a flowchart to illustrate an embodiment of a process for providing multiple views on a display. In some embodiments, multiple streams of data are transmitted to provide multiple views for display 405. In some embodiments, the multiple streams may be utilized in a plurality of different settings, such as a first setting in which a single view is provided to all views and a second setting in which different views are provided to different viewers. In some embodiments, a system may be required to identify a first view to be provided for a first user 410 if the view is to be set by the system. In some embodiments, a filtering element is provided to filter views such that the first view is provided to the first user and other views are filtered out 415. The type of filtering element varies in different embodiments. In some embodiments, filtering elements may be included in glasses worn by users. In some embodiments, a filtering element may be provided in a display apparatus.

In some embodiments, if the filtering element is selectable 420, the filtering element may be set to a first view 425. If the system includes remote access for switching to a view 430, such as when the glasses worn by a user are addressable by the multi-view display system, then a signal is sent to the filtering element and the filter is set in response to the signal 435. If the system does not include remote access then the user may be allowed to switch the filtering element 440, such as setting switchable glasses to a particular view. If the filter element is not selectable 420, then the appropriate filtering element may be provided or made available to the first user 442, such as, for example, providing glasses that include proper lens and filters for a particular view.

In some embodiments, if a filter element includes a sensor to determine a state of the filtering element, such as whether the glasses are in use, what view the glasses are set to, or both, and a transmitter to report data back to the multi-view display system 445, then a signal is sent from the filter element to the multi-view display system regarding the state of the filter element 450 and such signal may be received at the multi-view display system 455. The selected first view is presented to the first user 460, with the filtering element filtering other views from the display to prevent such views from reaching the first user.

In some embodiments, individual systems or devices may be sources, sinks, or both of multi-stream video data. In some embodiments, a particular class of system or device accepts multiple independent streams and combines the streams, either for transport or for direct display. In some embodiments, the system or device may interleave the streams as appropriate for the display or transport format. In some embodiments, the system or device may select streams from a subset of its inputs.

In some embodiments, before multiple video streams are combined for display or transport, the video streams may be converted or adjusted to a common format, temporal relationship, or both. In some embodiments, similar requirements may be implemented in other video processing devices or systems, such as, for example, in production equipment for television broadcast.

In some embodiments, a device or element for video alignment (referred to herein as an aligning device) may accept streams in arbitrarily different formats. In some embodiments, the aligning device performs image scaling, frame-rate conversion, and interlacing or deinterlacing as needed to bring the input streams to a common format. In some embodiments, the aligning device may further buffer data as required so that the data is available when needed for display or output.

Figure 5:
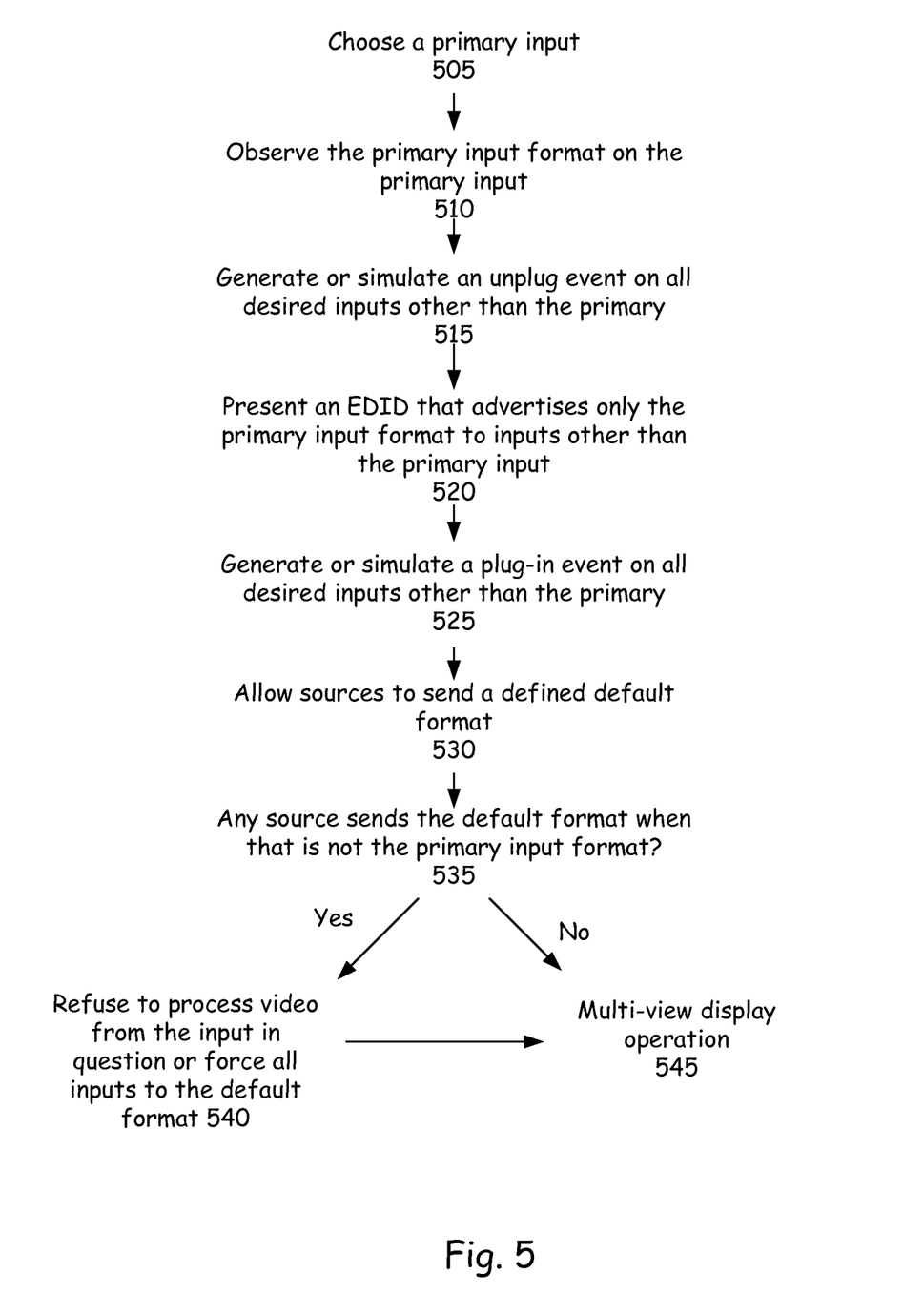
FIG. 5 illustrates an embodiment of a process for forcing compatible devices to a common format.

In some embodiments, a system or device may operate to eliminate or reduce processing or buffering required to align video streams for a multi-view display. In some embodiments, an aligning device may force all inputs to have a compatible format, such as requiring inputs to have the same resolution, have the same frame rate, and either be interlaced or not interlaced, and by doing so eliminate the need to perform scaling, frame-rate conversion, and interlacing/deinterlacing respectively. In an example, a system or device may use hot-plug technology and EDID (Extended Display Identification Data) to force HDMI compatible devices to a common format. FIG. 5 illustrates an embodiment of a process for forcing compatible devices to a common format. In an example, a process provides:

1. Choose a primary input 505.
2. Observe the video format (primary input format) on the primary input 510.
3. Generate or simulate an unplug event on all desired inputs other than the primary 515.
4. Present an EDID that advertises only the primary input format to inputs other than the primary input 520.
5. Generate or simulate a plug-in event on all desired inputs other than the primary 525.
6. Allow sources to send a defined default format 530. Should any source send the default format when that is not the primary input format 535, the aligning device may, for example, refuse to process video from the input in question or force all inputs, including the primary, to the default format 540, using a process similar to processes 3-5. Otherwise, the process continues with multi-display operation 545.

In some embodiments, a process may be enhanced to search for a best format common to a group of desired sources, where best may defined by a preference list or other metric. In some embodiments, a process may be enhanced with an aligning device that may perform one or more of scaling, frame-rate conversion, or interlacing/deinterlacing.

In some embodiments, an aligning device may reduce buffer requirements by forcing all inputs to have the same video timing. Mechanisms may include gen-lock, line-lock, and frame-lock, depending on the granularity and accuracy of synchronization required. For example, for pixel-interleaved formats, fully gen-locked sources require very little buffering.

In some embodiments, an aligning device may use a gen-lock-, line-lock-, or frame-lock-like mechanism, but with the mechanism used to force devices to a specific phase relationship other than in-phase. For example, a device that is combining two streams into a frame-interleaved format may reduce buffering by forcing the half an input frame time out of phase. In an example, a system or device acting to combine three data streams into a side-by-side format may reduce buffering by forcing the second inputs to be delayed by one-third and two-thirds of a line time respectively.

Figure 6:
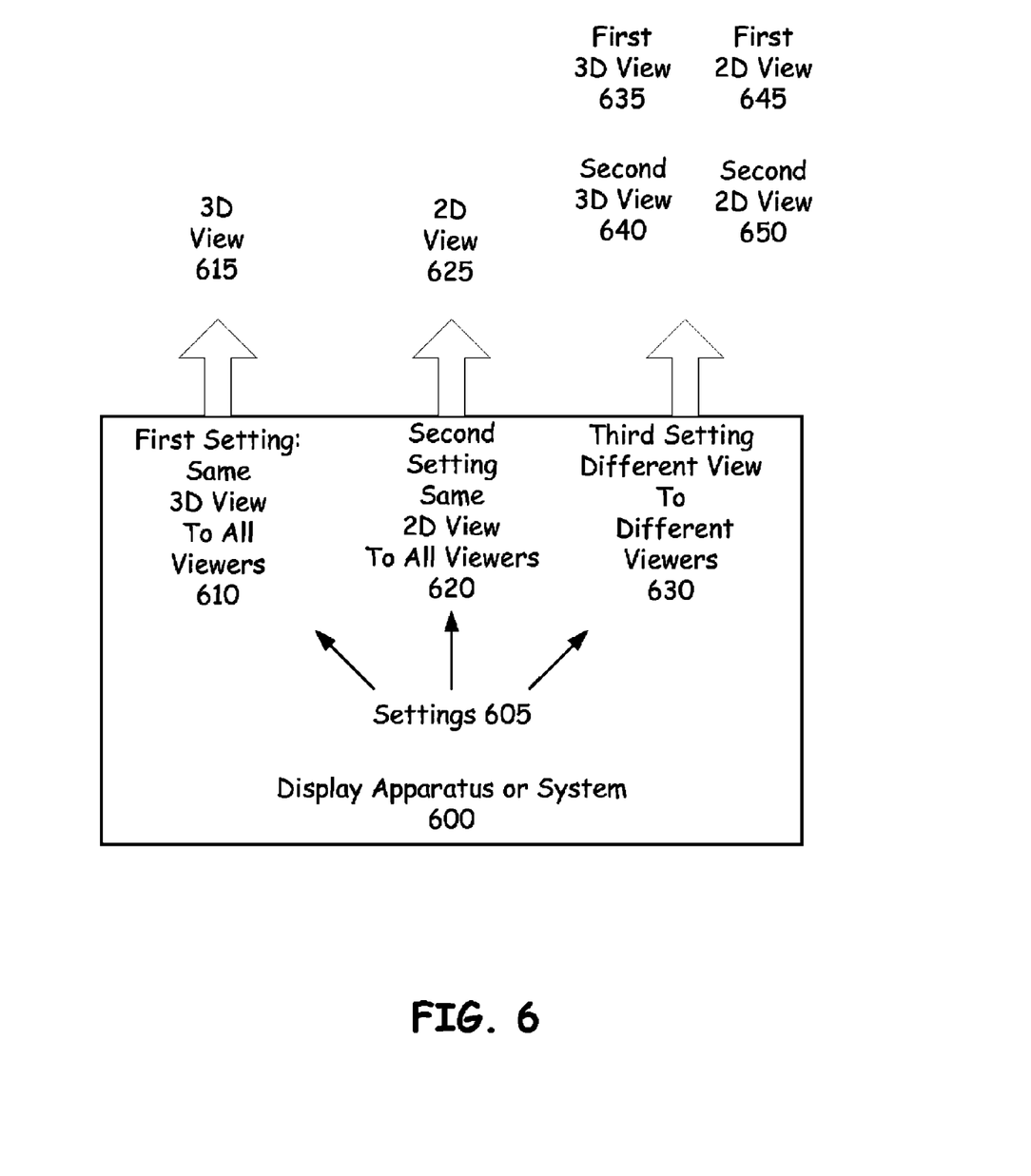
FIG. 6 is an illustration of an embodiment of a multi-view display apparatus or system.

FIG. 6 is an illustration of an embodiment of a multi-view display apparatus or system. In this illustration, a multi-view display apparatus or system 600, including, for example, multi-view display apparatus 200 illustrated in FIG. 2, includes a plurality of settings 605 for providing images to viewers.

In some embodiments, the settings 605 of the multi-view display apparatus or system 600 may include a first setting to provide a same 3D view to all viewers 610, illustrated as 3D view 615. In some embodiments, the settings 605 may include a second setting to provide a same 2D view to all viewers 620, illustrated as 2D view 625. In some embodiments, the settings may include a third setting in which different views are provided to different viewers 630. In some embodiments, the views may include a mixture of 2D and 3D views, depending on the content that is available for viewers. In this illustration, the views may include a first 3D view 635, a second 3D view 640, a first 2D view 645, and a second 2D view 650.

In some embodiments, the apparatus or system 600 may dynamically switch between settings 605 as required. In some embodiments, the apparatus or system 600 may instruct or set a filter or filters, such as filtering devices or elements 165-175 illustrated in FIG. 1, to all be set to the same setting to provide the 2D or 3D view. In some embodiments, the use of a single view may occur at a beginning, end, or other point in an image presentation when all viewers should view a single view. For example, the single view may be an introductory image for all viewers; an emergency image to communicate a message to all viewers; or other image intended for all viewers.

Figure 7:
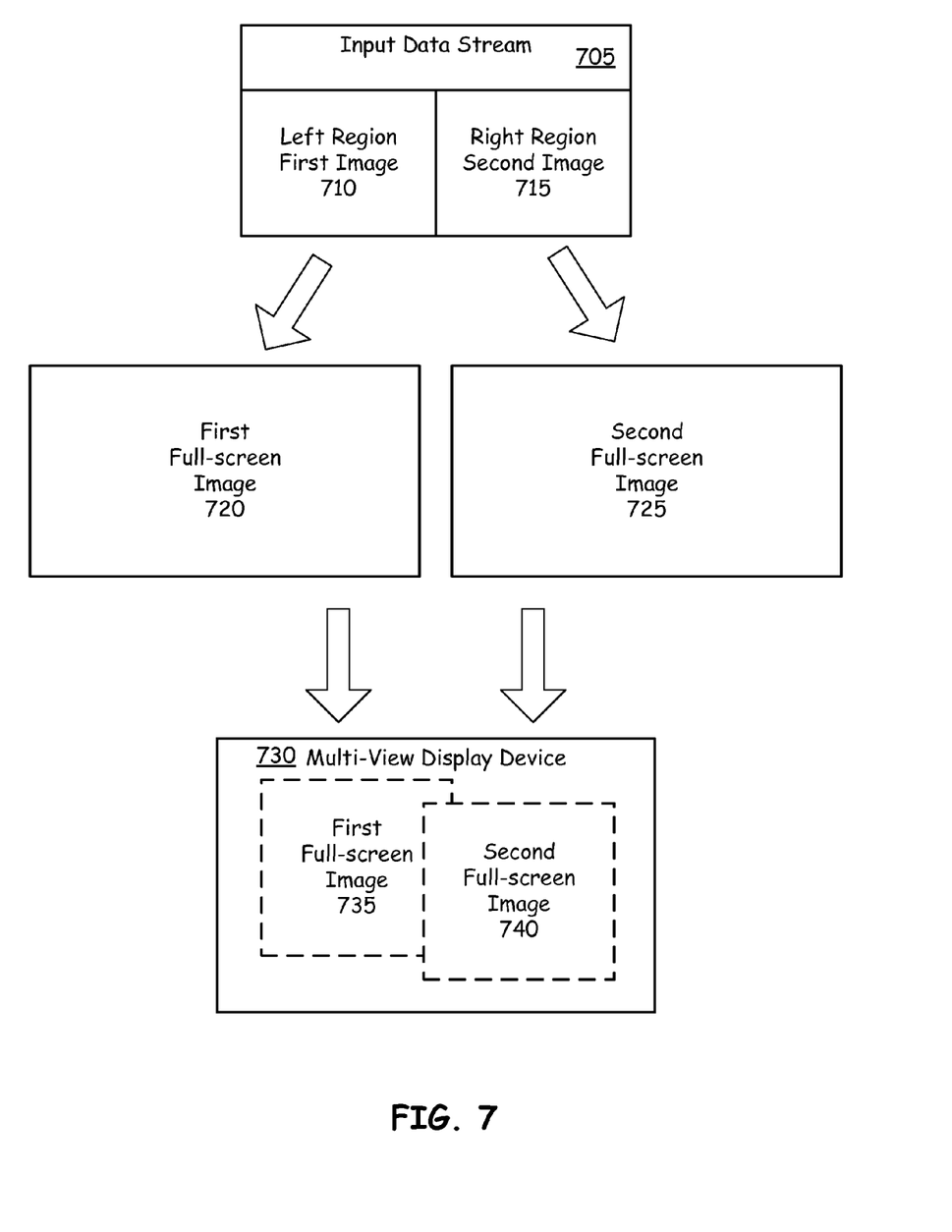
FIG. 7 illustrates an embodiment of generation and display of multiple images.

FIG. 7 illustrates an embodiment of generation and display of multiple images. In this illustration, an input data stream 705 includes a plurality of images in different regions of the data stream. As shown in FIG. 7, the input data stream may provide a first image in a first region 710, shown here as a left half region, and a second image in a second region 715, shown here as a right half region. FIG. 7 illustrates two regions for simplicity, but embodiments are not limited to any particular number of regions.

In some embodiments, the images contained in the regions are scaled up such that such images are larger (such as full-screen) images. In this illustration, the first image 710 is scaled up to generate a first full-screen image 720 and the second image 715 is scaled up to generate a second full-screen image 725.

In some embodiments, the enlarged/full-screen images are presented simultaneously to viewers, illustrated here as first full-screen image 735 and second full-screen image 740 being displayed together on a multi-view display screen 730.

Figure 8:
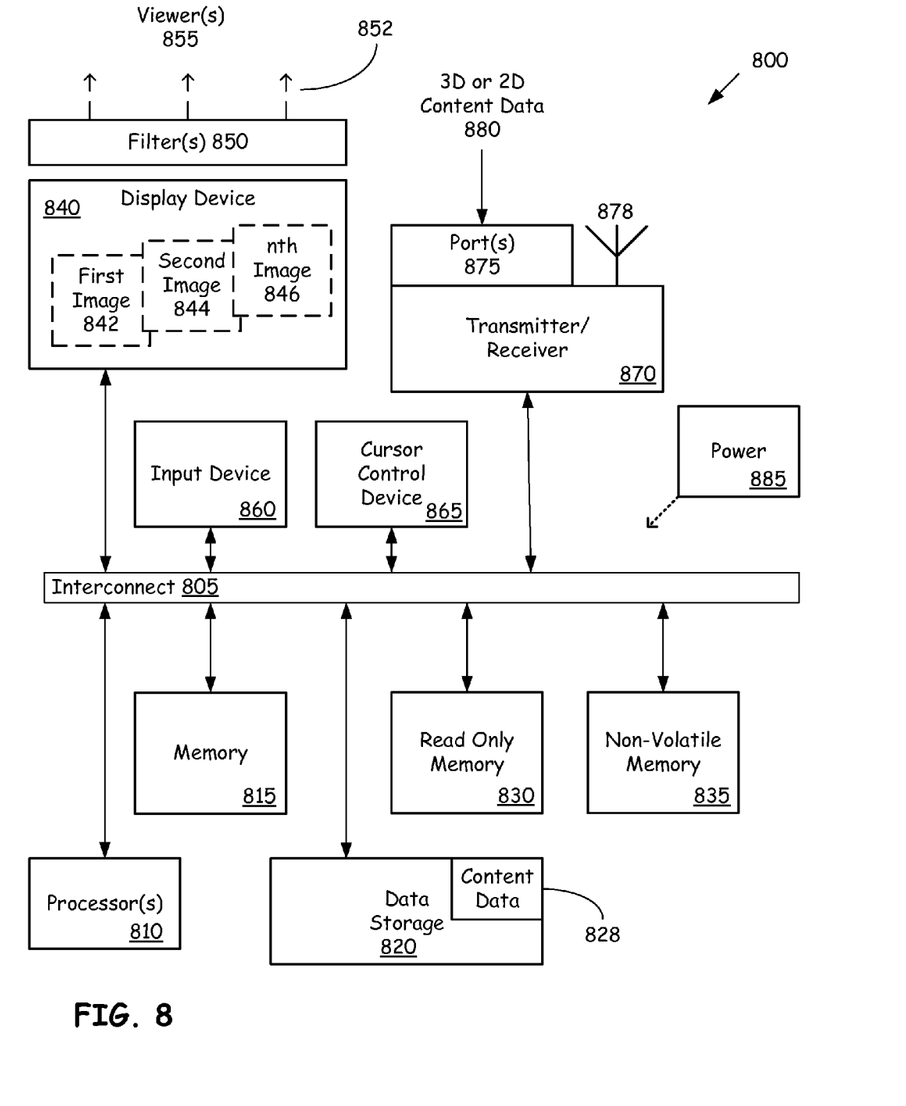
FIG. 8 is an illustration of an embodiment of an electronic device or system for providing multiple image views.

FIG. 8 is an illustration of an embodiment of an electronic device or system for providing multiple image views. In this illustration, certain standard and well-known components that are not germane to the present description are not shown. Under some embodiments, a device or system 800 is a system to provide multiple views on a display screen that may separately viewed by one or more viewers.

Under some embodiments, the device 800 comprises an interconnect or crossbar 805 or other communication means for transmission of data. The data may include audio-visual data and related control data. The device 800 may include a processing means such as one or more processors 810 coupled with the interconnect 805 for processing information. The processors 810 may comprise one or more physical processors and one or more logical processors. Further, each of the processors 810 may include multiple processor cores. The interconnect 805 is illustrated as a single interconnect for simplicity, but may represent multiple different interconnects or buses and the component connections to such interconnects may vary. The interconnect 805 shown in FIG. 8 is an abstraction that represents any one or more separate physical buses, point-to-point connections, or both connected by appropriate bridges, adapters, or controllers. The interconnect 805 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 800 further may include a serial bus, such as USB bus, to which may be attached one or more USB compatible connections.

In some embodiments, the device 800 further comprises a random access memory (RAM) or other dynamic storage device as a memory 815 for storing information and instructions to be executed by the processors 810. Memory 815 also may be used for storing data for data streams or sub-streams. RAM memory includes, for example, dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may contain certain registers or other special purpose memory. The device 800 also may comprise a read only memory (ROM) 830 or other static storage device for storing static information and instructions for the processors 810. The device 800 may include one or more non-volatile memory elements 835 for the storage of certain elements.

In some embodiments, a data storage 820 may be coupled to the interconnect 805 of the device 800 for storing information and instructions. The data storage 820 may include a magnetic disk, an optical disc and its corresponding drive, or other memory device. Such elements may be combined together or may be separate components, and utilize parts of other elements of the device 800. In some embodiments, the data storage may include storage of content data 828 for presentation on a multi-view display.

The device 800 may also be coupled via the interconnect 805 to a multi-view display device or element 840. In some embodiments, the display may include a liquid crystal display (LCD), a plasma display, or any other display technology, for displaying information or content to an end user. In some embodiments, the display 840 may be utilized to display multiple images, including different 2D and 3D images to different viewers. In this illustration, the display device or element 840 is shown to be simultaneously presenting multiple images, such as a first image 842, a second image 844, through an nth image 846. In some embodiments, the display device or element may include or operate in conjunction with one or more filters 850, the one or more filters 850 operating to separate views 852 that are intended for one or more viewers 855. The filters 850 may include filtering devices or elements 165-175 illustrated in FIG. 1 and filtering elements such as glasses 305 and lens or filter 355 illustrated in FIG. 3.

In some environments, the display 840 may include an audio device, such as a speaker for providing audio information, including the audio portion of a program.

In some embodiments, an input device 860 may be coupled to or communicate with the apparatus or system 800 for communicating information and/or command selections to the processors 810. In various implementations, the input device 860 may be a remote control, keyboard, a keypad, a touch screen, voice activated system, or other input device, or combinations of such devices. In some embodiments, the device or system may further include a cursor control device 865, such as a mouse, a trackball, touch pad, or other device for communicating direction information and command selections to the one or more processors 810 and for controlling cursor movement on the display 840.

One or more transmitters or receivers 870 may also be coupled to the interconnect 805. In some embodiments, the device 800 may include one or more ports 875 for the reception or transmission of data. Data that may be received or transmitted may include 3D or 2D content data 880. The device 800 may further include one or more antennas 878 for the reception of data via radio signals. The device 800 may also comprise a power device or system 885, which may comprise a power supply, a battery, a solar cell, a fuel cell, or other system or device for providing or generating power. The power provided by the power device or system 885 may be distributed as required to elements of the device 800.

In some embodiments, certain forms of video processing may be performed at various locations in a multi-view display system or device. In some embodiments, the system or device may perform filtering that is appropriate to the display or transport format. For example, the system or device may vertically low-pass filter an image that will be displayed on a line-alternate display.

In some embodiments, a system or device may mix the audio related to a video stream, rather than pass all channels from all the inputs. For example, in a two-player gaming application, the system or device may mix a first player's audio down to mono, and present the mixed audio as the left audio channel, and a second player's audio to mono and present that as the right channel. In some embodiments, more complex processes for audio, such as surround sound or virtual surround sound, may be implemented.

In some embodiments, displays and source devices contain one or more frame buffers that are used to overlay a user interface over video data. In some embodiments, each stream for a multi-view application may utilize its own interface. In some embodiments, a device that presents user interfaces contains an overlay frame buffer for each stream.

With the display of video streams on a multi-view display, there may be a potential for the viewing by one user of a video stream intended for another user (such as viewing without glasses, or in circumstances in which an unintended video stream is not sufficiently filtered and bleeds through the viewing of another video stream). In some embodiments, a multi-display device or system may add extra streams to an input stream in order to obscure the others on the display. In one example, given a first stream of video data, a device or system may add a second stream that is the inverse of the first stream. When viewed without glasses on a display, combination of the video streams will appear (approximately) to be grey.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored there on computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment,

What is claimed is:

1. An apparatus comprising:
   a display screen to display a plurality of views simultaneously;
   a controller to control the plurality of views presented on the display screen;
   inputs to receive a plurality of streams of video data from one or more sources, wherein the inputs may receive the streams of video data in a plurality of different formats; and
   an aligning device to cause the plurality of streams of video data to be in a common format;
   wherein the apparatus is configurable by the controller to provide a plurality of view settings, the view settings including a first setting in which the apparatus provides a single view to each viewer of the display screen and a second setting in which the apparatus provides a first view to a first viewer of the display screen and a second view to a second viewer of the display screen, wherein the first view is generated from a first stream of video data and the second view is generated from a second stream of video data;
   wherein a first filtering element filters views presented to viewers of the display screen such that an intended view is displayed to one or more viewers.

2. The apparatus of claim 1, wherein in the second setting the first filter element filters the views presented to the first viewer such that the first view is displayed to the first user and the second view is obscured from the first user viewer and a second filtering element filters the views presented to the second viewer such that the second view is displayed to the second viewer and the first view is obscured from the second viewer.

3. The apparatus of claim 1, wherein the first setting provides a same three-dimensional (3D) view to each viewer, and the second setting provides a first two-dimensional (2D) view to the first viewer and a second 2D view to the second viewer.

4. The apparatus of claim 1, wherein the apparatus further includes a transmitter to transmit signals to the first filtering element.

5. The apparatus of claim 4, wherein the signals to the first filtering element instruct the first filtering element to switch to the intended view.

6. The apparatus of claim 1, wherein the apparatus further includes a receiver to receive signals from the first filtering element.

7. The apparatus of claim 6, wherein the signals from the first filtering element provide a status of the first filter element.

8. A method comprising:
   receiving a plurality of streams of video data from one or more sources, wherein the plurality of streams of video data may be in a plurality of different formats;
   requiring the formats of the plurality of streams of video data to be a common format;
   generating a plurality of images based on the plurality of streams of video data;
   projecting the plurality of images on a first display screen; and
   providing images on the first display screen to one or more viewers;
   wherein providing the images includes a first setting for providing a single image to all viewers of the first display screen and a second setting for providing a first image to a first viewer and a second image to a second viewer;
   wherein providing the images includes filtering the images projected by the first display screen to separate the images for viewing.

9. The method of claim 8, wherein in the second setting the second image is substantially unseen by the first viewer and the first image is substantially unseen by second viewer.

10. The method of claim 8, wherein in the first setting the image provided is a three-dimensional (3D) image and wherein in the second setting the first image is a first two-dimensional (2D) image and the second image is a second 2D image.

11. A system comprising:
    a display screen for display of a plurality of images;
    inputs to receive a plurality of streams of video data from one or more sources, wherein the inputs may receive the streams of video data in a plurality of different formats;
    an aligning device to cause the plurality of streams of video data to be in a common format;
    a signal element to provide the plurality of images to the display screen;
    a control unit including a controller to control the display of the plurality of images, the control unit to include a first setting for providing a same image to all viewers of the display screen and a second setting for providing a first image to a first viewer and a second image to a second viewer, wherein the first image is generated from a first stream of video data and the second image is generated from a second stream of video data; and
    one or more filter elements to filter the images displayed on the display screen.

12. The system of claim 11, wherein the control unit switches dynamically between the first setting and the second setting.

13. The system of claim 11, wherein a first filter element is a set of glasses for a first user.

14. The system of claim 13, wherein the glasses include a switch to switch the glasses between settings for the first image and the second image.

15. The system of claim 14, wherein the switch may be set by a user of the glasses.

16. The system of claim 14, wherein the glasses includes a receiver and the control unit includes a transmitter, and wherein the switch may be set in response to a signal sent by the controller via the transmitter and received by the glasses via the receiver.

17. The system of claim 13, wherein the glasses include one or more sensors to detect a state of the glasses.

18. The system of claim 17, wherein the glasses include a transmitter to transmit data regarding the state of the glasses and wherein the control unit includes a receiver to receive the data regarding the state of the glasses.

19. The system of claim 11, wherein the first filter element is a filter for the display screen.

20. The system of claim 11, wherein the first image and the second image are polarized images with different polarization, and wherein the first filter element includes a polarized filter.

21. The system of claim 11, wherein the first image and the second image are presented at alternating intervals, and wherein the first filter element includes a shutter to open during intervals for the first view and close during intervals for the second view.

22. The system of claim 11, wherein the first view and the second view utilize different colors, and wherein the first filter element includes a color filter.

23. A non-transitory computer readable storage medium having stored thereon data representing sequences of instructions that, when executed by a processor, cause the processor to perform operations comprising:
- receiving a plurality of streams of video data from one or more sources, wherein the plurality of streams of video data may be in a plurality of different formats;
- requiring the one or more sources of the plurality of streams of video data to provide such streams of video data in a common format;
- generating a plurality of images based on the plurality of streams of video data;
- providing data for the plurality of images for display on a first display screen; and
- directing one or more filter element to filter images projected by the first display screen, wherein filtering images includes separating the images to provide viewing by one or more users;
- wherein providing viewing of the images includes a first setting for providing a single image to all viewers of the first display screen and a second setting for providing a first image to a first viewer and a second image to a second viewer.

24. The medium of claim 23, wherein in the first setting the image provided is a three-dimensional (3D) image and wherein in the second setting the first image is a first two-dimensional (2D) image and the second image is a second 2D image.

25. The apparatus of claim 1, wherein the aligning device causing the streams of video data to be in a common format includes the aligning device to choose a primary input, observe a primary input format on the primary input, and advertise the primary input format to inputs other than the primary input.

26. The apparatus of claim 1, wherein the aligning device causing the streams of video data to be in a common format includes the aligning device requiring one or more of a common resolution, a common frame rate, or a common interlace status.

27. The method of claim 8, wherein requiring the formats of the plurality of streams of video data to be a common format includes:
- choosing a primary input and observing a primary input format on the primary input;
- generating or simulating an unplug event on inputs other than the primary input;
- advertising the primary input format to the inputs other than the primary input; and
- generating or simulating a plug-in event for the inputs other than the primary.

28. The method of claim 26, further comprising:
- allowing the sources to send a defined default format; and
- if any source sends a default format on an input when the default format is not the primary input format, either refuse to process video from the input or force all inputs to the default input.

29. The system of claim 11, wherein the aligning device requiring the one or more sources to provide the streams of video data in a common format includes the aligning device to choose a primary input, observe a primary input format on the primary input, and advertise the primary input format to inputs other than the primary input.

\* \* \* \* \*